US012783444B2

(12) United States Patent
Schwagmann et al.

(10) Patent No.: US 12,783,444 B2
(45) Date of Patent: Nov. 3, 2026

(54) SMART CONNECTOR UNIT AND METHOD FOR AN IO-LINK SYSTEM

(71) Applicant: Turck Holding GmbH, Halver (DE)

(72) Inventors: Hermann Schwagmann, Detmold (DE); Peter Strunkmann, Detmold (DE)

(73) Assignee: Turck Holding GmbH, Halver (DE)

( * ) Notice: Subject to any disclaimer, the term of this patent is extended or adjusted under 35 U.S.C. 154(b) by 12 days.

(21) Appl. No.: 19/010,271

(22) Filed: Jan. 6, 2025

(65) Prior Publication Data

US 2025/0139045 A1 May 1, 2025

Related U.S. Application Data

(63) Continuation-in-part of application No. PCT/EP2023/064630, filed on Jun. 1, 2023.

(30) Foreign Application Priority Data

Jul. 5, 2022 (DE) ..................... 10 2022 116 648.1

(51) Int. Cl.
*G06F 13/00* (2006.01)
*G06F 13/20* (2006.01)
*G06F 13/40* (2006.01)

(52) U.S. Cl.
CPC .......... *G06F 13/4068* (2013.01); *G06F 13/20* (2013.01); *G06F 2213/40* (2013.01)

(58) Field of Classification Search
CPC ............................ G06F 13/4068; G06F 13/20
See application file for complete search history.

(56) References Cited

U.S. PATENT DOCUMENTS 10,452,504 B2 * 10/2019 Elend .................. G06F 13/4072
12,001,371 B2 * 6/2024 Buesching .......... G06F 13/4221
12,007,736 B2 6/2024 Wagner et al.
12,430,082 B2 * 9/2025 Schwagmann .... G05B 19/0428
(Continued)

FOREIGN PATENT DOCUMENTS

DE 19710137 A1 10/1997
DE 102007032845 A1 1/2009
(Continued)

OTHER PUBLICATIONS

Search Report issued in DE 10 2022 112 116 648.1, to which this application claims priority, mailed Jul. 17, 2024 (English-language machine translation attached).
(Continued)

*Primary Examiner* — Tammara R Peyton
(74) *Attorney, Agent, or Firm* — Pearl Cohen PartGmbB; Raphael Tautz

(57) ABSTRACT

A connector comprises a master unit, and a device unit connected to the master unit and being configured to be connected to an IO-Link master. The connector is configured to be connected to an IO-Link device and to receive first operating data from the IO-Link device, the first operating data being IO-Link compliant, and to be connected to a capture unit and to receive second operating data from the capture unit, and output the received first operating data enriched with the received second operating data as third operating data via the device unit to the IO-Link master.

16 Claims, 5 Drawing Sheets

(56) References Cited

U.S. PATENT DOCUMENTS

| | | | |
|---|---|---|---|
| 2013/0222123 | A1 | 8/2013 | Wessling |
| 2015/0134856 | A1 | 5/2015 | Feinaeugle |
| 2015/0331827 | A1 | 11/2015 | Beyer et al. |
| 2021/0311458 | A1 | 10/2021 | Appel et al. |

FOREIGN PATENT DOCUMENTS

| | | | |
|---|---|---|---|
| DE | 102010025515 | A1 | 12/2011 |
| DE | 102012009494 | A1 | 11/2013 |
| DE | 102014106752 | A1 | 11/2015 |
| DE | 102016217706 | B4 | 1/2018 |
| DE | 102018109307 | B3 | 7/2019 |
| DE | 102020109241 | A1 | 10/2021 |
| DE | 102020134409 | B3 | 1/2022 |
| EP | 2211464 | A1 | 7/2010 |
| EP | 3324579 | B1 | 7/2020 |

OTHER PUBLICATIONS

International Search Report and Written Opinion issued in PCT/EP2023/064630, to which this application claims domestic benefit, mailed Aug. 29, 2023 (English-language machine translation attached).

* cited by examiner

SMART CONNECTOR UNIT AND METHOD FOR AN IO-LINK SYSTEM

CROSS REFERENCE TO RELATED APPLICATIONS

This application is a continuation-in-part application of international patent application PCT/EP2023/064630, filed on Jun. 1, 2023, and designating the U.S., which claims priority to German patent application 10 2022 116 648.1, filed on Jul. 5, 2022, each of which are hereby incorporated by reference in their entireties.

TECHNICAL FIELD

The disclosure relates to a connector to be used in industrial automation. The connector can be inserted into an existing data communication line between an IO-Link device and an IO-Link master.

BACKGROUND

IO-Link is a short distance, bi-directional, digital, point-to-point, wired or wireless, industrial communications networking standard (IEC 61131-9) used for connecting digital sensors and actuators to either a type of industrial fieldbus or a type of industrial Ethernet.

An IO-Link system comprises an IO-Link master and one or more IO-Link devices, i.e. sensors or actuators. The IO-Link master provides the interface to the higher-level controller (PLC) and controls the communication with the connected IO-Link devices.

An IO-Link master can have one or more IO-Link ports. Traditionally, only one IO-Link device can be connected to an IO-Link port at a time.

SUMMARY

A connector is provided. The connector comprises a master unit and a device unit. The master unit is configured to be connected to an IO-Link device. The device unit is connected to the master unit. The device unit is configured to be connected to an IO-Link master. The connector is configured to receive first operating data from the IO-Link device, the first operating data being IO-Link compliant. The connector is configured to be connected to a capture unit and to receive second operating data from the capture unit. The connector is configured to output the received first operating data enriched with the received second operating data as third operating data via the device unit to the IO-Link master.

DETAILED DESCRIPTION

Figure 1:
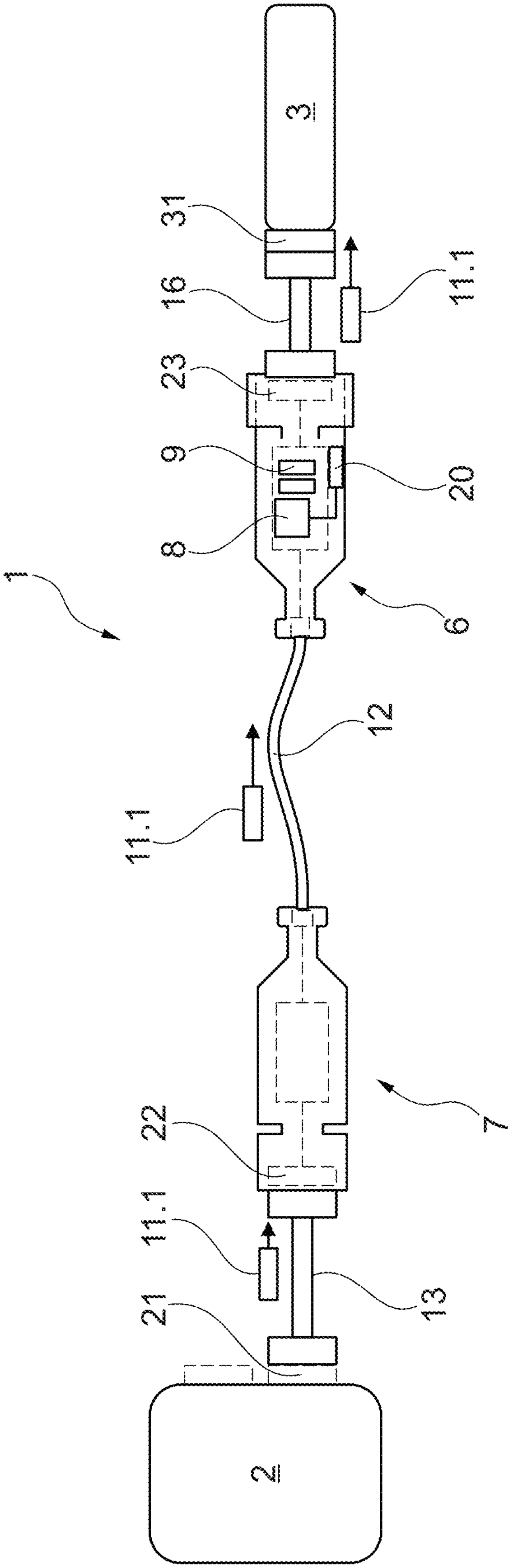
FIG. 1 schematically shows a (smart) connector according to a first configuration in a first operating state, FIG. 2 schematically shows the (smart) connector according to the first configuration in a second operating state, FIG. 3 schematically shows the (smart) connector according to a second configuration, and FIG. 4 schematically shows the (smart) connector according to a third configuration, FIG. 5 schematically shows a flow chart of a method for operating the connector.

In the following, details are set forth to provide a more thorough explanation of the disclosure. However, it will be apparent to those skilled in the art that these implementations may be practiced without these specific details. In other instances, well-known structures and devices are shown in block diagram form or in a schematic view rather than in detail in order to avoid obscuring the disclosure. In addition, features described hereinafter may be combined with each other, even if described with respect to different figures, unless specifically noted otherwise.

Equivalent or like elements or elements with equivalent or like functionality are denoted in the following description with equivalent or like reference numerals. As the same or functionally equivalent elements are given the equivalent or like reference numbers in the figures, a repeated description for elements provided with the equivalent or like reference numbers may be omitted. Hence, descriptions provided for elements having the equivalent or like reference numbers are mutually exchangeable.

Directional terminology, such as "top," "bottom," "below," "above," "front," "behind," "back," "leading," "trailing," etc., may be used with reference to the orientation of the figures being described. Because parts of the disclosure, described herein, can be positioned in a number of different orientations, the directional terminology is used for purposes of illustration and is in no way limiting. It is to be understood that other implementations may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

The terms "substantially" and "approximately" may be used herein to account for small manufacturing tolerances (e.g., within 5%) that are deemed acceptable in the industry without departing from the aspects of the implementations described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

To the extent that the disclosure refers to IO-Link compliant, e.g. data being IO-Link compliant or a communication being IO-Link compliant, it will be apparent to those skilled in the art that compliance with the standard IEC 61131-9 is meant. Additionally, even if the term "IO-Link compliant" is not mentioned explicitly with respect to certain features, it will be apparent to those skilled in the art that those features can be in compliance with the standard IEC 61131-9. An overview of IO-Link systems can be found in the "IO-Link System Description" published by the PROFIBUS Nutzerorganisation e.V. (see https://io-link.com/share/Downloads/At-a-glance/IO-Link_System_Description_eng_2018.pdf) which is incorporated herein in its entirety.

Operating data may be or comprise process data, value status, device data and/or events. Operating data may be communicated in an IO-Link standard compliant manner. It is possible that the field does not communicate in an IO-Link standard compliant manner. The operating data may be communicated with one or more data frames. The data structure of the one or more data frames may be IO-Link compliant. The operating data may be communicated cyclically or not cyclically.

The process data of the IO-Link device can be transmitted cyclically in a data frame in which the size of the process data is specified by the IO-Link device. Depending on the IO-Link device, 0 to 32 bytes of process data can be possible (for each input and output). The consistency width of the transmission can be flexible, i.e. not fixed, and can thus be dependent on the IO-Link master.

Each port can have a value status (PortQualifier). The value status can indicate whether the process data are valid or invalid. The value status can be transmitted cyclically with the process data, optionally in the same data frame.

Device data can be parameters, identification data, and/or diagnostic information. Device data can be exchanged acyclically and at the request of the IO-Link master. Device data can be written to the IO-Link device (Write) and/or read from the IO-Link device (Read).

When an event occurs, the IO-Link device can signal the presence of the event to the IO-Link master. The IO-Link master then can read out the event. Events can be error messages (e.g., short-circuit) and/or warnings/maintenance data (e.g., soiling, overheating). Error messages can be transmitted from the IO-Link device to a controller or a Human Machine Interface (HMI) via the IO-Link master. The IO-Link master can also transmit events and statuses on its behalf. Examples of such events are wire breaks or communication failures. The transmission of device parameters or events can occur independently from the optionally cyclic transmission of process data. These transmissions do not influence or impair each other.

A connecting cable can be at least a 3-conductor cable standardized according to the IO-Link standard.

The microprocessor can be designed to process the operating data as required in accordance with the IO-Link standard, and to exchange said operating data between the master unit and the device unit.

Optionally, at least the operating data received from the IO-Link master or the IO-Link device can be forwarded in mirrored form by the smart connector unit.

A capture unit can be provided. The capture unit can be connected to the microprocessor (as a further data source) and designed/configured to capture the second operating data. The microprocessor can be designed to receive the captured data, i.e. the third operating data, from the capture unit. The microprocessor can be designed to convert said captured data—if required—in an IO-Link compliant manner. The microprocessor can be designed to insert at least some of the captured data into the first operating data in accordance with the IO-Link standard. The microprocessor can be designed to forward these operating data, i.e. the first operating data, supplemented with captured data to the device unit in accordance with the IO-Link standard. The device unit can be designed to forward or output these enriched or supplemented operating data, i.e. the first operating data, (optionally at the request of a connected IO-Link master).

Optionally organized by the microprocessor, the operating data can be stored as required at least partially and/or at least temporarily in a storage element or memory.

The master unit can be configured to carry out:

- an IO-Link-compliant data processing of the operating data, and/or
- an IO-Link-compliant forwarding of these processed operating data.

The device unit may function as a virtual IO-Link device simulating an IO-Link device for the IO-Link master and similarly the master unit may function as a virtual IO-Link master simulating an IO-Link master for the IO-Link device.

The microprocessor can be designed to carry out further processing steps, optionally comprising a data compression and/or data selection of the operating data.

The capture unit may be or may comprise:

- a sensor, i.e. the capture unit can be configured to determine an external chemical-physical measured value and/or a parameter, such as, for example, temperature, pressure, vibration, inclination, humidity or magnetic field strength; and/or
- a connector sensor, i.e. the capture unit can be configured to determine an internal value for the smart connector unit or an associated component and/or a parameter, such as, for example, electrical voltage, current strength, current flow, magnetic field strength, data volume, data frequency, data speed; and/or
- a transmission unit for the data exchange with an external receiver, such as, for example, a smartphone, a tablet computer, a laptop, a service unit, a display monitor, etc., wherein the data exchange can be performed, in particular, by means of radio communication, i.e. wirelessly. Any known radio protocol and data standard can be used here, in particular WLAN, WiFi, Bluetooth, UMTS, LTE, 3G, 4G, 5G standard.

A method for (optionally bidirectional) data transmission can be provided. The data can be transmitted between a (real, physical) IO-Link device and a (real, physical) IO-Link master via at least one connector. The IO-Link device and the IO-Link master can be connected via the connector and an at least 3-conductor cable which has at least one signal line C/Q and at least two supply lines L+, L−. The connector can comprise a microprocessor with an interface which serves to transmit and receive data. The interface can be a UART interface. The data can be transmitted along a data path formed at least partially by the connector (optionally according to the master-slave principle, as defined in the IO-Link standard).

The data processing can be performed anywhere in the connector. The microprocessor can be provided in or assigned to the master unit. The master unit can be responsible for the organization of the processing, (temporary) storage and/or transmission of operating data. The microprocessor can provide an interface for data transmission between the master unit and the device unit.

The microprocessor can be a dual-port microprocessor (DPR, DPRAM).

The master unit and the device unit can be configured to exchange data with one another via a standardized interface (e.g. IO-Link, Ethernet, SPI, I2C) or via a proprietary interface.

Enriching the first operating data with the second operating data may comprise:

- extending the operating data in the form of process data (optionally as described with respect to the first configuration in order to obtain IO-Link compliant data);
- supplementing the ISDU index (indexed service data unit) for the retrieval of (enriched) operating data in the form of parameter data (optionally using a higher-level controller/control unit);
- when an event occurs, triggering and transmitting operating data in the form of event data;
- supplementing the direct parameter page (DPP) (this may allow that the device is identified as an IO-Link device) except for the supplemented data. The supplemented/enriched data do not necessarily have to be listed and described here in the IODD;

and/or

- extending the M sequence, wherein an extension of the IO-Link master can be required for this purpose.

The IO-Link master can be connected in a data path to a plurality of IO-link devices and/or capture units.

The operating data, e.g. the process data, can comprise information relating to a parameter or a measurement value (e.g. temperature, voltage, current) detected by the IO-Link device and/or the capture unit.

FIG. 1 schematically shows a connector 1. The connector 1 comprises a master unit 6 and a device unit 7. The device unit 7 is connected to the master unit 6 by a cable 12. The cable 12 comprises at least two power supply lines and a communication/signal line for transmission of data between the master unit 6 and the device unit 7.

The master unit 6 is connected to an IO-Link device 3, optionally a sensor and/or an actuator, by a cable 16. The cable 16 comprises at least two power supply lines and a communication line for transmission of data between the master unit 6 and the IO-Link device 3. The master unit 6 comprises a socket 23 receiving at least three-pins, wherein two of the at least three-pins are for the power supply lines of the cable 16 and a third one of the at least three-pins is for the communication line of the cable 16. The cable 16 is connected to a port 31 of the IO-Link device 3. The socket 23 is provided within the same connector body or housing 15 as the master unit 6.

The device unit 7 is connected to an IO-Link master 2 by a cable 13. The cable 13 comprises at least two power supply lines and a communication line for transmission of data between the device unit 7 and the IO-Link master 2. The device unit 7 comprises a plug 22 with at least three-pins, wherein two of the at least three-pins are for the power supply lines of the cable 13 and a third one of the at least three-pins is for the communication line of the cable 13. The cable 13 is connected to a port 21 of the IO-Link master 2. The plug 22 is provided within the same connector body or housing 14 as the device unit 7.

The master unit 6 is connected to a capture unit 20, optionally a sensor and/or an actuator. The capture unit 20 is provided within the same connector body or housing 15 as the master unit 6. Alternatively, the capture unit 20 can be located remote from the master unit 6, i.e. not within the same housing 15, and can be connected to the master unit 6, optionally in the same manner the master unit 6 is connected to the IO-Link device 3.

The connector 1 comprises a memory 9 and a control unit 8, e.g. a microprocessor. The memory 9 is configured to store or buffer the first operating data, the second operating data and/or the third operating data 11.2-11.4. The microprocessor 8 is configured to enrich, optionally combine, the first operating data 11.2 with the stored second operating data 11.3 to generate the third operating data 11.4 and to output the generated third operating data 11.4 to the device unit 7 and thus via the device 7 to the IO-Link master 2.

Figure 5:
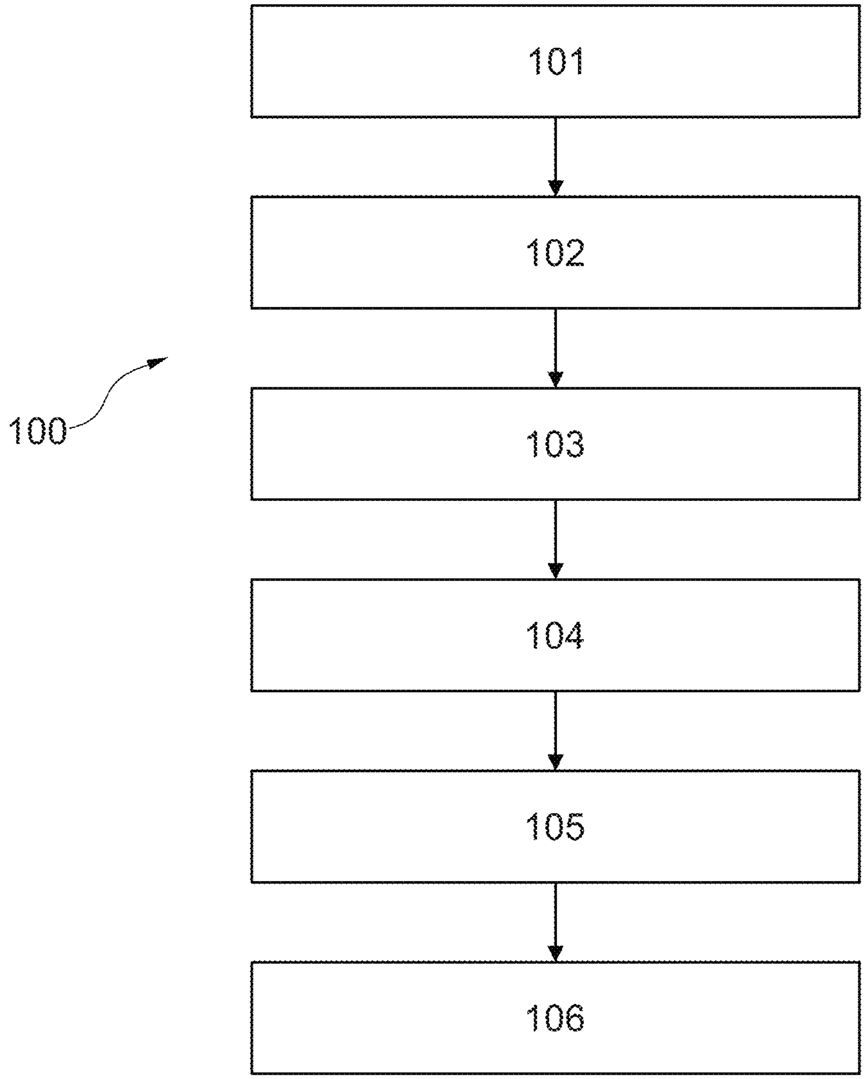

The connector 1 as described herein is configured to carry out a method 100, a flowchart of which is shown in FIG. 5.

In a first step 101 of the method 100, which corresponds to a first operating state of the connector 1 as shown in FIG. 1, the connector 1 receives an operating data request 11.1 from the IO-Link master 2 and forwards the received request 11.1 (optionally unchanged) to the IO-Link device 3. The operating data request is IO-Link compliant, i.e. the data format and the data transmission thereof are IO-Link compliant. In other words, the request 11.1 can be output in the same manner as the IO-Link master 2 would output a request (or master telegram) if the IO-Link device 3 was connected directly, i.e. not via the connector 1, to the IO-Link master 2. The request 11.1 is output from the IO-Link master 2 via its port 21 and the communication line of the cable 13 to the connector 1. At the connector 1, the request 11.1 is received at the port 22 of the device unit 7.

Figure 2:
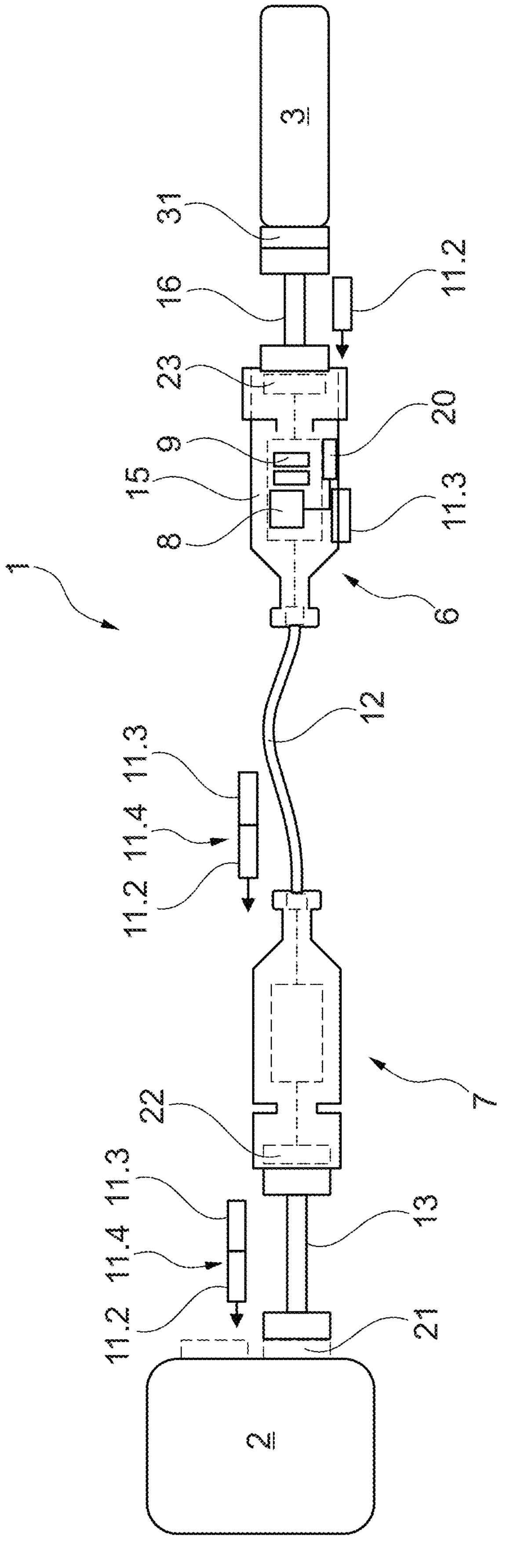

In a second step 102 of the method 100, which corresponds to a second operating state of the connector 1 as shown in FIG. 2, the connector 1 receives first operating data 11.2 in a first data frame from the IO-Link device 3. The IO-Link device 3 outputs the first operating 11.2 in response to the request 11.1 forward by the connector 1 in the first step 101. The first operating data are IO-Link compliant, i.e. their data format and the data transmission thereof are IO-Link compliant. In other words, the first operating data 11.1 can be output in the same manner as the IO-Link device 3 would output them if the IO-Link device 3 was connected directly, i.e. not via the connector 1, to the IO-Link master 2. The first operating data 11.2 is output from the IO-Link device 3 via its port 31 and the communication line of the cable 16 to the connector 1. At the connector 1, the first operating data 11.2 is received at the port 23.

In a third step 103 of the method 100, which corresponds to a second operating state of the connector 1 as shown in FIG. 2, the connector 1 receives second operating data 11.3 in a second data frame. The second operating data 11.2 is output from the capture unit 20 to the master unit 6.

In a fourth step 104 of the method 100, which corresponds to a second operating state of the connector 1 as shown in FIG. 2, the master unit 6 enriches the received first operating data 11.2 with the received second operating data 11.3. The enriched first operating data, i.e. the third operating data 11.4, can be IO-Link compliant.

In a fifth step 105 of the method 100, which corresponds to a second operating state of the connector 1 as shown in FIG. 2, the master unit 6 outputs the generated third operating data 11.4 from the master unit 6 via the cable 12 to the device unit 7.

In a sixth step 106 of the method 100, which corresponds to a second operating state of the connector 1 as shown in FIG. 2, the device unit 7 outputs the received third operating data 11.4 to the IO-Link master 2 in an IO-Link compliant manner.

In FIGS. 1 and 2 a first configuration of the connector 1 is shown. According to this first configuration, the connector simulates a further IO-Link master being connected to the IO-Link device 3 and a further IO-Link device being connected to the IO-Link master 2. That is, from the perspective of the IO-Link master 2, the connector 1 simulates the IO-Link device 3. From the perspective of the IO-Link device 3, the connector simulates the IO-Link master 2.

The above-described method 100 may be carried out cyclically, wherein one cycle of the method 100 is described above.

In the following three optional configurations or more concrete implementations of the disclosure will be described.

A first configuration is shown in FIGS. 1 and 2. According to the first configuration, the master unit 6 acts as an IO-Link master and the device unit 7 acts as an IO-Link device. According to the first configuration, the connector 1 forwards the master telegram 11.1 as described with respect to the first step 101 above. Triggered by the master telegram 11.1, the IO-Link device 2 answers or outputs the first operating data 11.2 to the connector 1 (see the second step 102 described above). A soon as the first operating data 11.2 is received at the master unit 6, the microprocessor 8 combines the first operating data 11.2 with the second operating data 11.3 previously received from the capture unit 20 and stored in the memory 9 (see third step 103 described above) thereby generating one data frame 11.4 (see fourth step 104 described above). The data frame 11.4 is IO-Link compliant and is output by the microprocessor 8 via the IO-Link device 7 to the IO-Link master 2 as soon as or in response to a further or the next master telegram 11.1 received at the IO-Link device unit 7 in the next cycle of the method 100 (see fifth and sixth step 105, 106 described above).

Figure 3:
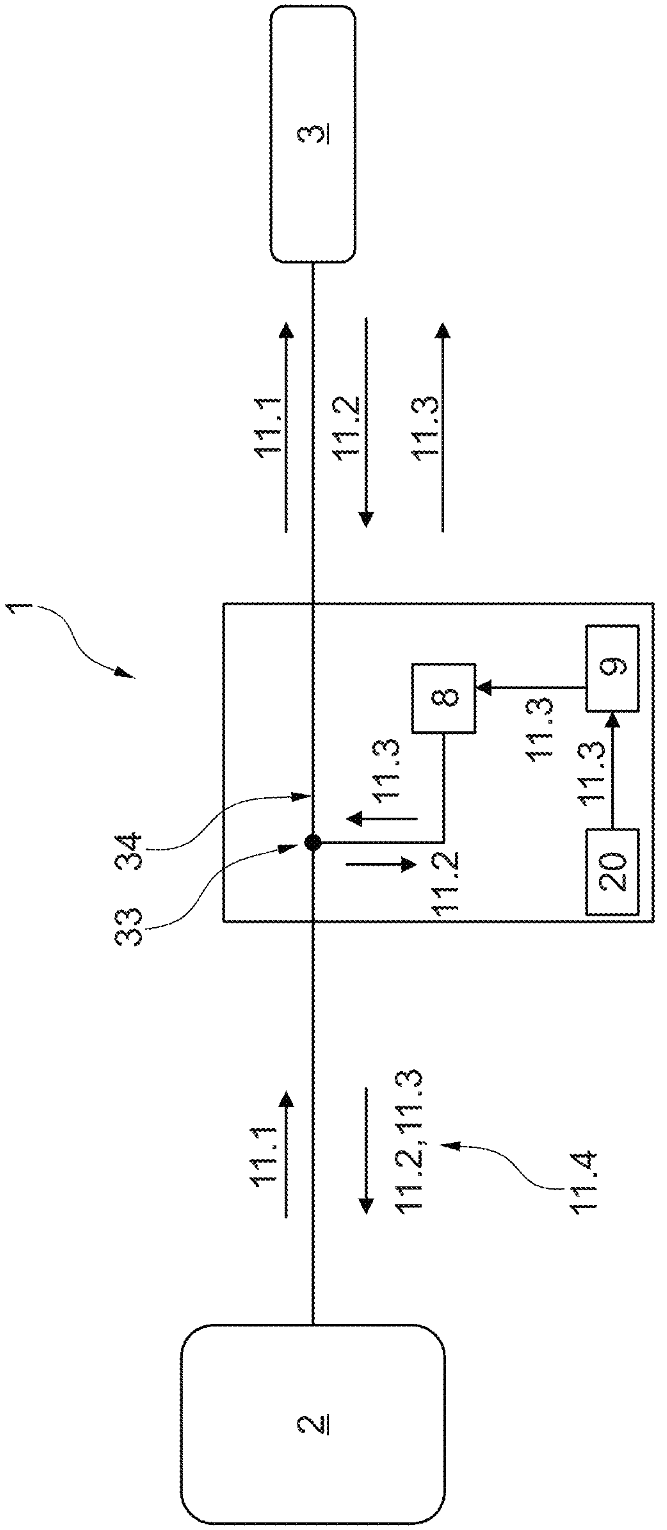

A second configuration is shown in FIG. 3. According to the second configuration, the connector 1 forwards the master telegram 11.1 from the IO-Link master 2 to the IO-Link device 3 (see the first step 101 described above). Triggered by the master telegram 11.1, the IO-Link device 3 answers or outputs the first operating data 11.2 to the connector 1 (see the second step 102 described above). The first operating data 11.2 is forwarded by the connector 1 to the IO-Link master 2 (see the fourth step 104 described above) and receipt of the first operating data 11.2 at the connector 1 is detected by the microprocessor 8. The microprocessor 8 is connected to a data line 34 of the connector 1 via connection 33. As soon as or when receipt of the first operating data 11.2 is detected by the microprocessor 8, the microprocessor 8 outputs the second operating data 11.3 previously received from the capture unit 20 and stored in the memory 9 (see third step 103 described above) to the IO-Link master 2 thereby enriching the first operating data 11.2 with the second operating data 11.3 (see fifth and sixth step 105, 106 described above). The third operating data 11.4 can comprise two separate data frames, i.e. the first operating data 11.2 may form one data frame and the second operating data 11.3 may form another data frame. In this configuration, since the second operating data 11.2 may also reach the IO-Link device 3 when output by the microprocessor 8, the IO-Link device 3 can be configured to ignore the second operating data 11.2.

Figure 4:
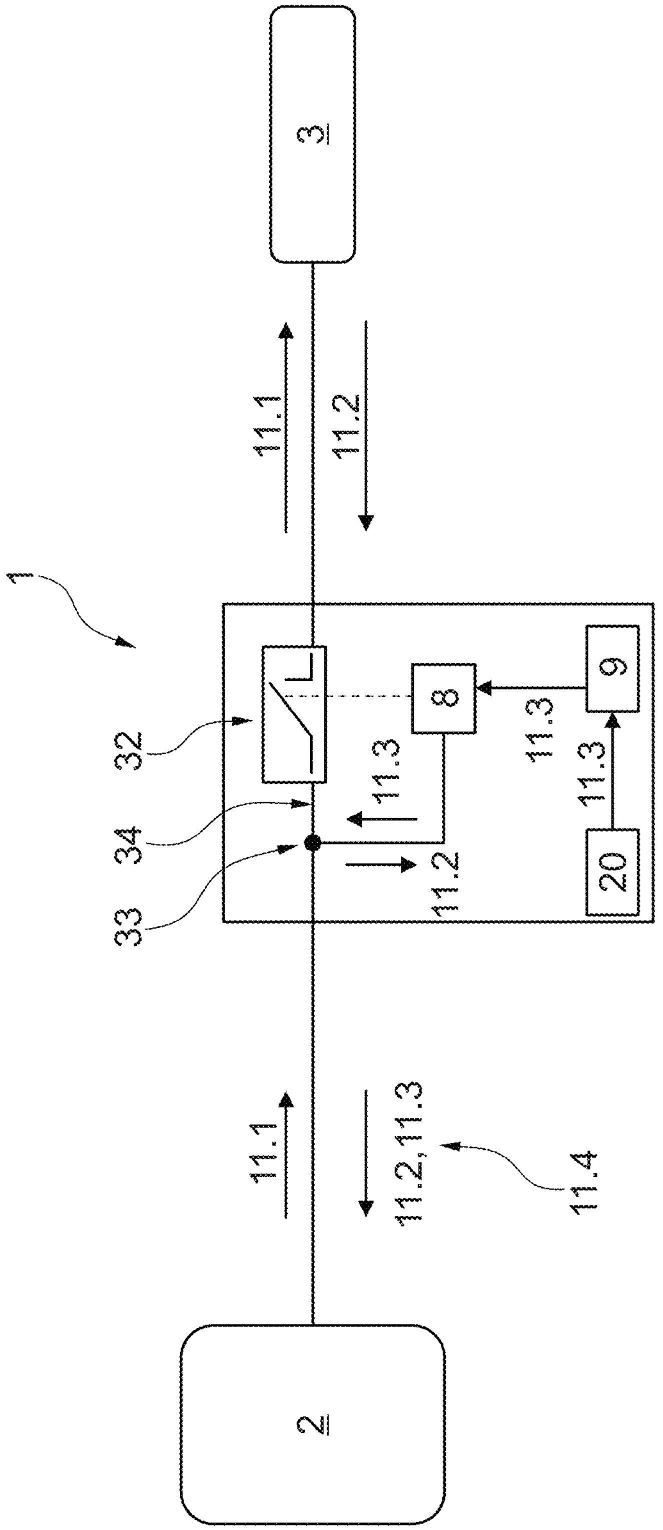

A third configuration is shown in FIG. 4. The third configuration differs in that from the second configuration, that the connector 1 further comprises a switch element 32 arranged in the data line 34. The switch element is connected to the microprocessor 8 and configured to open and close the data line 34 thereby interrupting (in an open state as shown in FIG. 4) or allowing (in a closed state) data communication from the IO-Link master 2 and the microprocessor 8 to the IO-Link device 3. According to the third configuration, the switch 32 is initially in the closed state such that the connector 1 forwards the master telegram 11.1 from the IO-Link master 2 to the IO-Link device 3 (see the first step 101 described above). Triggered by the master telegram 11.1, the IO-Link device 3 answers or outputs the first operating data 11.2 to the connector 1 (see the second step 102 described above). The first operating data 11.2 is forwarded by the connector 1 to the IO-Link master 2 (see the fourth step 104 described above) and receipt of the first operating data 11.2 at the connector 1 is detected by the microprocessor 8. As soon as or when receipt of the first operating data 11.2 is detected by the microprocessor 8, the microprocessor 8 opens the switch 32 thereby interrupting data communication via the line 34 to the IO-Link device 3 and outputs the second operating data 11.3 previously received from the capture unit 20 and stored in the memory 9 (see third step 103 described above) to the IO-Link master 2 thereby enriching the first operating data 11.2 with the second operating data 11.3 (see fifth and sixth step 105, 106 described above). As described above, the third operating data 11.4 can comprise two separate data frames, i.e. the first operating data 11.2 may form one data frame and the second operating data 11.3 may form another data frame. In this configuration, since the second operating data 11.2 cannot reach the IO-Link device 3 when output by the microprocessor 8, the IO-Link device 3 does not need configured to ignore the second operating data 11.2. Subsequently, before beginning of the next cycle of the method 100, the microprocessor closes the switch 32.

LIST OF REFERENCE CHARACTERS

1 connector
2 IO-Link master
3 IO-link device
6 master unit
7 device unit
8 microprocessor
9 memory
11.1 operating data request/mater telegram
11.2 first operating data
11.3 second operating data
11.4 third operating data including first and operating data at least partly
12, 13, 16 cable
20 capture unit
21 port of IO-Link master
22 port of device unit
23 port of master unit
31 port of IO-Link device
32 switch element
33 connection of microprocessor to data line
34 data line through connector
100 method
101 forward operating data request
102 receive first operating data at master unit
103 receive second operating data at master unit
104 enrich first with second operating to generate third operating data at master unit
105 forward third operating data to device unit

106 output third operating data to IO-Link master

What is claimed is:

1. A connector, comprising:
a master unit, and
a device unit connected to the master unit and being configured to be connected to an IO-Link master,
the connector being configured to:
be connected to an IO-Link device and to receive first operating data from the IO-Link device, the first operating data being IO-Link compliant,
be connected to a capture unit and to receive second operating data from the capture unit, and
output the received first operating data enriched with the received second operating data as third operating data via the device unit to the IO-Link master.

2. The connector according to claim 1,
wherein the connector is configured to receive an operating data request from the IO-Link master at the device unit and to forward the received request via the master unit to the IO-Link device.

3. The connector according to claim 1, the connector comprising:
a memory, wherein the memory is configured to store the received second data operating data, and
a control unit, wherein the control unit is configured to output the stored second operating data via the device unit to the IO-Link master when the second operating was received by the master unit.

4. The connector according to claim 3, the connector comprising:
a switch element,
wherein the control unit is configured to control the switch such that a data communication from the master unit to the IO-Link device is interrupted when the control unit outputs the stored second operating data via the device unit to the IO-Link master.

5. The connector according to claim 3,
wherein the control unit is configured to combine the first and the second operating data into one data frame in order to generate the third operating data.

6. The connector according to claim 5,
wherein the generated third operating data are IO-Link compliant.

7. The connector according to claim 5,
wherein the control unit is configured to output the generated third operating data as the one data frame to the IO-Link master via the device unit in response to a further operating data request received at the device unit from the IO-Link master (2).

8. The connector according to claim 1, further comprising:
a cable connecting the master unit to the device unit.

9. The connector according to claim 8,
wherein the cable comprises at least two power supply lines and a communication line.

10. The connector according to claim 1, the master unit comprising:
a housing, and
a socket configured to receive at least three-pins, wherein two of the at least three-pins are for power supply lines and a third one of the at least three-pins is for a communication line.

11. The connector according to claim 1, the device unit comprising:
a housing, and
a plug with at least three-pins, wherein two of the at least three-pins are for power supply lines and a third one of the at least three-pins is for a communication line.

12. The connector according to claim 1, wherein the capture unit is a sensor and/or an actuator.

13. The connector according to claim 1, wherein the capture unit is a sensor and the second operating data being captured by the sensor.

14. The connector according to claim 13, wherein the sensor includes at least one of following:
a voltage measurement device for measuring an electrical voltage inside the connector,
a current measurement device for measuring an electrical current flowing through the connector,
a vibration measurement device for measuring a vibration of the connector, and
an environmental sensor for measuring an environmental parameter in an environment of the connector.

15. The connector according to claim 1, wherein the capture unit is an integral part of the connector.

16. The connector according to claim 1, wherein the IO-Link device is a sensor and/or an actuator.

* * * * *